US010832493B2

(12) United States Patent
Aluru et al.

(10) Patent No.: US 10,832,493 B2
(45) Date of Patent: Nov. 10, 2020

(54) PROGRAMMATIC HAIRSTYLE OPACITY COMPOSITING FOR 3D RENDERING

(71) Applicant: Soul Vision Creations Private Limited, Bangalore (IN)

(72) Inventors: Sravanth Aluru, Bangalore (IN); Gaurav Baid, Bangalore (IN); Sarbartha Sengupta, Bangalore (IN)

(73) Assignee: Soul Vision Creations Private Limited (IN)

( * ) Notice: Subject to any disclaimer, the term of this patent is extended or adjusted under 35 U.S.C. 154(b) by 7 days.

(21) Appl. No.: 16/288,410

(22) Filed: Feb. 28, 2019

(65) Prior Publication Data

US 2020/0279440 A1   Sep. 3, 2020

(51) Int. Cl.
*G06T 19/20* (2011.01)
*G06F 9/38* (2018.01)
*G06K 9/62* (2006.01)

(52) U.S. Cl.
CPC ............ *G06T 19/20* (2013.01); *G06F 9/3877* (2013.01); *G06K 9/6202* (2013.01); *G06T 2210/62* (2013.01)

(58) Field of Classification Search
None
See application file for complete search history.

(56) References Cited

U.S. PATENT DOCUMENTS

| 7,868,900 | B2 | 1/2011 | Sirohey et al. | |
| 9,058,765 | B1* | 6/2015 | Mallick | G06F 3/0482 |
| 9,367,940 | B2* | 6/2016 | Weng | G06K 9/00281 |
| 10,217,244 | B2* | 2/2019 | Kowalczyk | G06K 9/00281 |
| 2012/0075331 | A1* | 3/2012 | Mallick | G06T 11/001 |
| | | | | 345/594 |
| 2013/0121569 | A1* | 5/2013 | Yadav | G06T 7/162 |
| | | | | 382/164 |

OTHER PUBLICATIONS

Adobe Photoshop Help and Tutorials Feb. 2013.*
International Search Report and Written Opinion of International Application No. PCT/IN2020/050152, dated Jun. 19, 2020, 9 pp.

* cited by examiner

*Primary Examiner* — Jason A Pringle-Parker
(74) *Attorney, Agent, or Firm* — Shumaker & Sieffert, P.A.

(57) ABSTRACT

Techniques are described for virtual representation creation and display. Processing circuitry may identify substantially transparent pixels in a virtual hairstyle, identify a first set of pixels that are away from the identified substantially transparent pixels, increase an opacity level for a second set of pixels that excludes the first set of pixels by a first amount, and generate the virtual hairstyle based on the first set of pixels and the second set of pixels having the increased opacity level. With the generated virtual hairstyle, processing circuitry of a personal computing device may blend, in a first pass, one or more pixels of the version of the generated virtual hairstyle having an opacity level greater than or equal to a threshold opacity level, and blend, in a second pass, one or more pixels of the version of the generated virtual hairstyle having an opacity level less than the threshold opacity level.

16 Claims, 5 Drawing Sheets

FIG. 5

PROGRAMMATIC HAIRSTYLE OPACITY COMPOSITING FOR 3D RENDERING

TECHNICAL FIELD

The disclosure relates to computerized virtual representation creation.

BACKGROUND

Online retail and e-commerce are increasingly taking market share from on premise traditional brick and mortar retailers. When shopping at brick and mortar retailers, a customer can try on apparel and accessories to ensure the right fit and style. When shopping online, a customer is limited in his or her ability to ensure the right fit, style, and overall appearance due to the inability to try on the apparel and accessories.

SUMMARY

In general, the disclosure describes example techniques of real-time rendering of virtual representations of a user, e.g., so-called avatars, that can be displayed on a personal computing device. As part of the virtual representation, the personal computing device may render the hair on the head of the virtual representation. However, there may be technical complications with rendering hair that looks realistic. For example, there can be over 100,000 strands of hair, and graphics processing units (GPUs) of personal computing devices may be ill-equipped to perform fast processing to render the hair in a way that is realistic.

This disclosure describes example technical solutions to these technical problems with practical applications of the example techniques described in this disclosure. For example, one or more network computing devices may be configured to pre-composite hairstyles such that opacity of underlying hair layers is increased to behave as fully opaque and a dense mesh. The pre-compositing may include increasing opacity of non-visible layers to reduce the number of transparency layers that need blending.

With the pre-composited hairstyles, a GPU of a personal computing device may be configured to render the hairstyles faster than other techniques. The GPU may perform a multi-pass operation. In a first pass, the GPU may render all fragments (e.g., pixels) having an opacity level greater than or equal to an opacity threshold. In a second pass, the GPU may render all fragments having an opacity level below the opacity threshold. In this way, with only two passes, the GPU may be configured to render the hairstyle, which allows personal computing devices to render the hairstyles relative quickly and in run-time.

In one example, the disclosure describes a method of virtual representation creation, the method comprising identifying substantially transparent pixels in a transparency map for a virtual hairstyle, wherein the virtual hairstyle includes a plurality of layers, wherein the substantially transparent pixels identify edges on hair strands within the virtual hairstyle, identifying a first set of pixels in one or more of the plurality of layers that are a first number of pixels away from the identified substantially transparent pixels, increasing an opacity level for a second set of pixels by a first amount, wherein the second set of pixels excludes pixels from the first set of pixels, and generating the virtual hairstyle based on the first set of pixels and the second set of pixels having the increased opacity level.

In one example, the disclosure describes a system of virtual representation creation, the system comprising a memory configured to store a transparency map for a virtual hairstyle, and one or more network computing devices comprising processing circuitry. The processing circuitry is configured to identify substantially transparent pixels in the transparency map for the virtual hairstyle, wherein the virtual hairstyle includes a plurality of layers, wherein the substantially transparent pixels identify edges on hair strands within the virtual hairstyle, identify a first set of pixels in one or more of the plurality of layers that are a first number of pixels away from the identified substantially transparent pixels, increase an opacity level for a second set of pixels by a first amount, wherein the second set of pixels excludes pixels from the first set of pixels, and generate the virtual hairstyle based on the first set of pixels and the second set of pixels having the increased opacity level.

In one example, the disclosure describes a personal computing device comprising a memory configured to store a version of a generated virtual hairstyle and processing circuitry. The processing circuitry is configured to blend, in a via a first pass through a graphics pipeline of the processing circuitry, one or more pixels of the version of the generated virtual hairstyle having an opacity level greater than or equal to a threshold opacity level, and blend, via a second pass through the graphics pipeline of the processing circuitry, one or more pixels of the version of the generated virtual hairstyle having an opacity level less than the threshold opacity level, wherein the generated virtual hairstyle is generated by identifying substantially transparent pixels in a transparency map for the virtual hairstyle, wherein the virtual hairstyle includes a plurality of layers, wherein the substantially transparent pixels identify edges on hair strands within the virtual hairstyle, identifying a first set of pixels in one or more of the plurality of layers that are a first number of pixels away from the identified substantially transparent pixels, and increasing an opacity level for a second set of pixels by a first amount, wherein the second set of pixels excludes pixels from the first set of pixels.

The details of one or more examples are set forth in the accompanying drawings and the description below. Other features, objects, and advantages will be apparent from the description and drawings, and from the claims.

DETAILED DESCRIPTION

Online retail and e-commerce are increasingly taking market share from on premise traditional brick and mortar retailers. However, online shopping experience, especially in fashion—apparels, accessories, beauty and personal care—has drawbacks as compared to experience in a physical store. In some cases, consumers discover and purchase fashion products online by evaluating static two-dimensional (2D) images of the fashion products on brand ambassadors or models. There is no ability for them to try the product before they buy as in a physical store and nor is the product personalized to them.

There are some online virtual try-on experiences, but the options are limited. Virtual try-on means a user viewing how a virtual representation of an apparel or accessory would look when worn by the user. Some virtual try-on experiences are not personalized. Virtualized accessories and apparel cannot be displayed together, and these techniques are not well suited for real-time rendering on personal computing devices, such as mobile devices (e.g., smart phones or tablets) or laptops, on which may users view and purchase apparel and accessories.

Online retail and e-commerce are increasingly taking market share from on premise traditional brick and mortar retailers. However, the online shopping experience, especially in fashion—apparels, accessories, beauty and personal care—has drawbacks compared to an experience in a physical store. In some cases, consumers discover and purchase fashion products online by evaluating static two-dimensional (2D) images of the fashion products on brand ambassadors or models. There is no ability for the customers to try before they buy as in a physical store and nor is the shopping experience personalized to the consumer.

There are some online virtual try-on experiences, but the options are limited. Virtual try-on means a user viewing how a virtual representation of an apparel or accessory would look when worn by the user. Some virtual try-on experiences are not personalized, and the virtualized accessories and apparel cannot be displayed together. These techniques are not well suited for real-time rendering on personal computing devices, such as mobile devices (e.g., smart phones or tablets) or laptops, on which many users view and purchase apparel and accessories.

This disclosure describes example techniques to generate a virtual representation of a user in real-time, as well as virtual representations of apparel and accessories in real-time, so that the user can determine the fit and style of the apparel and accessories. For example, a user may view how the apparel and accessories appear together on his or her body, as opposed to seeing the apparel and accessories separately on bodies that may not accurately reflect the user's body. In particular, this disclosure describes example techniques to render portions of the virtual representation that require high level of detail for realism in real-time.

One technical limitation of mobile devices or laptops may be that these types of devices lack computing resources to quickly render (e.g., in real-time) user body parts that require high level of detail for realism. For example, rendering hair on top of the user's head in the virtual representation may require a high level of detail to appear realistic. An average human has up to 100,000 to 150,000 hair strands on his or her head. Therefore, human hairstyles present significant content complexity, especially for realistic artificial lighting effects when rendered as virtual hairstyles on the virtual representation in a virtual three-dimensional environment. Moreover, due to the large number of hair strands, it is time and cost prohibitive to employ artists to model strands in different hairstyle meshes.

Some techniques to render hairstyle on desktops or other types of devices with high computing resources is for content creators to first create multiple layers of mesh plates to give the hair structure and apply full transparency in thin stripes to these mesh plates to emulate real-life gaps between hair strands. Such techniques work well for desktop rendering using light ray tracing algorithms. Also, hardware advancements in central processing units (CPUs) and graphics processing units (GPUs) allows for use of computation-intensive light tracing algorithms.

Even with high-end hardware components, such techniques can take a few seconds per frame to render which can be prohibitively long for real-time rendering. Moreover, personal computing devices have hardware components with limited computation resources as compared to desktop computers, resulting in even longer rendering times on personal computing devices.

To address this, some techniques reduce the number of layers of transparency that a light ray is passed through and ray traced during rendering. Layers of transparency (also called transparency layers) do not require for pixels to be fully transparent. Layers of transparency or transparency layers refer to pixels that are not fully opaque. In a 2D transparency map, the transparency layers are encoded as pixels are not fully opaque. In the 3D world, the layers are effectively mesh plates that are mapped to the 2D transparency map (e.g., the transparency gets applied to the 3D mesh plates) to recreate the hair strands effect visually during rendering.

Because the number of layers of transparency are reduced, the resulting hairstyle tends not be realistic. For example, there are visible artifacts created because of incomplete transparency blending. In some cases, the scalp shows through as many layers of transparency of the hair are discarded by the rendering process on the personal computing device during light ray tracing.

In some techniques, to overcome the issues with reduced number of layers of transparency, an artist manually edits and increases the opacity of all underlying mesh layers of the hair until the layer of the scalp to control the number of layers that need to be blended. For example, the layers having the increased opacity are not discarded as part of the ray tracing, but the number of transparent layers is reduced. However, such techniques are highly time-intensive and do not provide an adequate solution for generating graphical information for multiple different hairstyles relatively quickly for outputting to the personal computing device for rendering.

Another technique to address the issues with reduced number of layers of transparency is to use compute-intensive rendering shaders that perform multiple passes on hairstyles on a layer-by-layer basis and blending the transparency layers layer-by-layer in subsequent passes. For personal computing devices, this may still be too long of a wait, especially in cases where the user desires to quickly see different selected hairstyles.

This disclosure describes example techniques in which different hairstyles are pre-composited in such a manner as to allow the GPU of the personal computing device to render the hairstyle in real-time. For instance, the user may select to view a particular hairstyle and the personal computing device may be able to quickly render the hairstyle for the user. Then, when the user selects a different hairstyle, the personal computing device may be able to quickly render the new hairstyle without needing the user to wait too long for the hairstyle to change to the newly selected hairstyle.

As described in more detail, one or more network computing devices may be configured to selectively increase an opacity level by a certain amount in non-visible layers of hair used to form the hairstyle. This way the example techniques reduce the number of the pixels that are transparent, especially those that are in non-visible portions. The GPU on the personal computing device can then blend, in a first pass, pixels having an opacity level that is greater than or equal to an opacity threshold value. The GPU on the personal computing device may then blend, in a second pass, the remaining pixels having an opacity level less than the opacity threshold value with the result of the blending in the first pass.

In this manner, with only two passes, the GPU on the personal computing device may render the hairstyle. The amount of time needed for the GPU to perform the two passes may be sufficiently small (e.g., less than a second) to not have a negative impact on user experience and achieve high responsiveness rendering times with limited impact on visual realism and quality of the rendered hairstyles.

Figure 1:
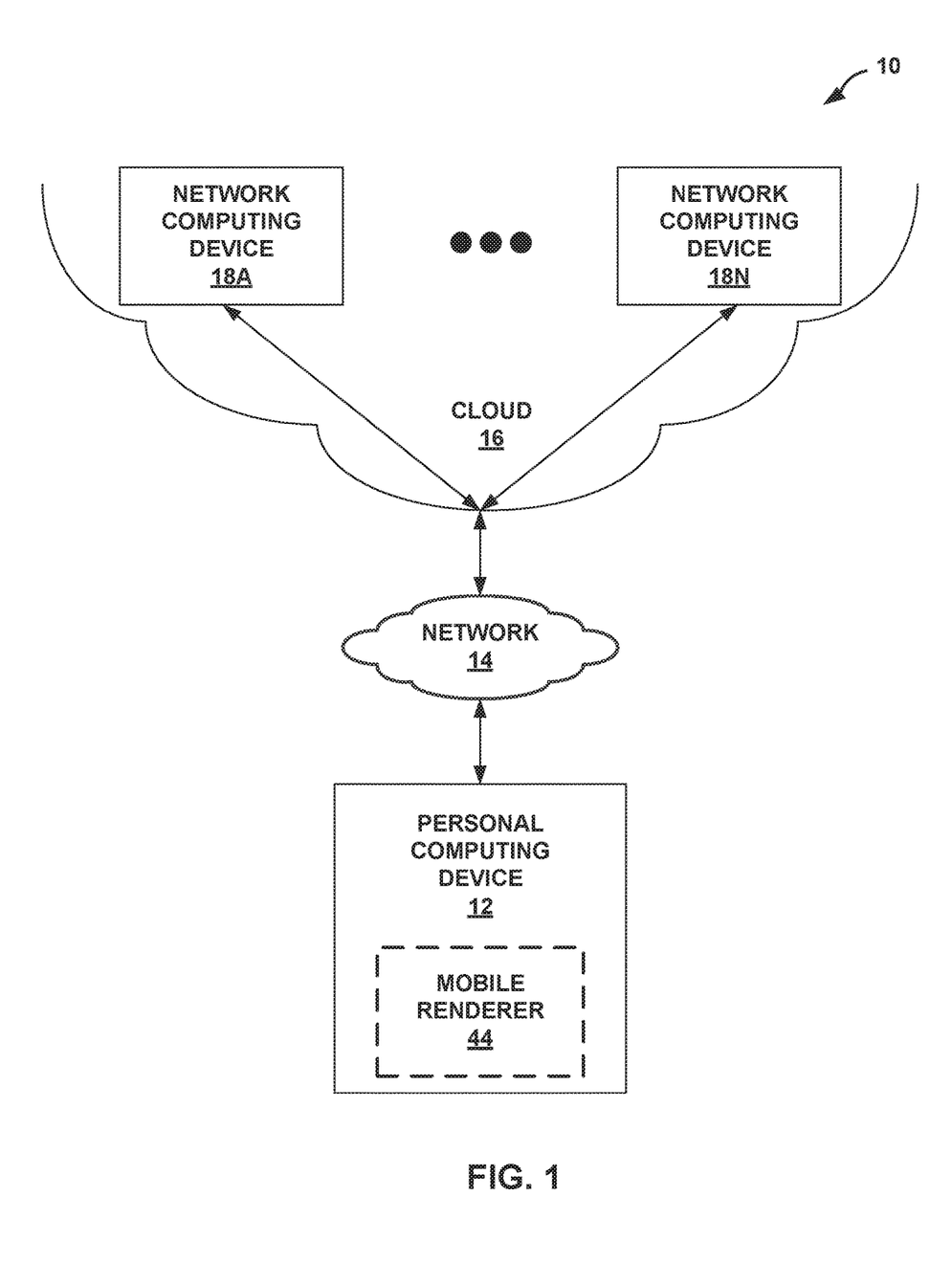
FIG. 1 is a block diagram illustrating a system for creating virtual representations of users in accordance with one or more example techniques described in this disclosure.

FIG. 1 is a block diagram illustrating a system 10 for creating virtual representations of users in accordance with one or more example techniques described in this disclosure. As illustrated, system 10 includes personal computing device 12, network 14, and cloud 16. Cloud 16 includes network computing devices 18A-18N (collectively referred to as "network computing devices 18").

Examples of personal computing device 12 include mobile computing devices (e.g., tablets or smartphones), laptop or desktop computers, e-book readers, digital cameras, video gaming devices, and the like. In one or more examples, a user of personal computing device 12 may shop for apparel and accessories online. For example, the user may access online retailers and browse through their items to identify apparel or accessories to purchase. In some examples, the user of personal computing device 12 may be scrolling through content from various websites, and some apparel or accessories may pique his or her interest.

The user may be interested in determining whether to purchase the item or not but may not have access to a retailer where he or she can try on the item for fit and style. In some cases, even where retailer access is available, the user may desire to make more of an on-the-spot determination of whether the item will look satisfactory when worn. Moreover, the user may wish to ask friends and family of their opinion and taking everyone to the retailer may not be practical.

In the example techniques described in this disclosure, the user may create a virtual representation of himself or herself via personal computing device 12. The user may use the virtual representation to virtually try-on apparels and accessories to determine whether the style and fit is one he or she would want. The user may also be able to share (e.g., via social media or some other form) the virtual representation with the virtual apparels and accessories with friends and family to solicit opinions.

For determining the style and fit of the apparel and accessories, it may be possible that the user will cycle through many options or try many different combinations. To ensure high quality interaction, the user may desire that the virtual representation is created relatively quickly (e.g., in run-time). As described in more detail, this disclosure describes techniques to create such virtual representations in run-time allowing for the user to quickly view the apparel and accessories, including changes in hairstyles so that the user can determine which hairstyle to use with a particular outfit of apparel and accessories.

To create the virtual representation, the user may take an image of himself or herself (e.g., a selfie). The image should include the face of the user and can include other body parts as well. In some examples, rather than taking the image, the user may retrieve a previously stored image. For example, the user may either take a picture using his or her camera or use an already existing picture which has a frontal snapshot of the user's face. This can either be a 2D image, taken from a regular camera on mobile, desktop, etc., or a 3D depth image, taken from a 3D depth sensing camera.

The user may upload the image of the face of the user to one or more network computing devices 18 for further processing. In addition, the user may upload body type information, or upload images that show the body to one or more network computing devices 18 for further processing. One or more network computing devices 18 may generate a virtual representation (e.g., avatar) of the user based on the image and the body type information. For example, network computing devices 18 may provide responsive real-time cloud services that can, on a responsive real-time basis, generate custom 3D virtual representations (e.g., avatars) using a 2D frontal face selfie or using a 3D depth camera image of the frontal face along with a few body measurements or full body pictures which can be used to programmatically approximate user body measurements provided by the user.

As illustrated, network computing devices 18 are within cloud 16. Cloud 16 represents a cloud infrastructure that supports multiple network computing devices 18 on which applications or operations requested by one or more users run. For example, cloud 16 provides cloud computing for using network computing devices 18, hosted on network 14, to store, manage, and process data, rather than at personal computing device 12.

Network 14 may transport data between network computing devices 18 of cloud 16 and personal computing device 12. For example, network 14 may form part a packet-based network, such as a local area network, a wide-area network, or a global network such as the Internet. Network 14 may include routers, switches, base stations, or any other equipment that may be useful to facilitate data between personal computing device 12 and network computing devices 18.

Examples of network computing devices 18 include server devices that provide functionality to personal computing device 12. For example, network computing devices 18, in cloud 16, may share data or resources for performing computations for personal computing device 12. As one example, network computing devices 18 may be computing servers, but the example techniques are not so limited. Network computing devices 18 may be a combination of computing servers, web servers, database servers, and the like.

For example, network computing devices 18 may host an application, executing on processing circuitry, via which network computing devices 18 receive the image uploaded by the user and the body type information (e.g., as images or user input). The processing circuitry encompasses the processing circuitry of one or more of network computing devices 18 that together perform the example techniques described in this disclosure.

The processing circuitry of network computing devices 18 may determine key features on the face of the user from the image and determine 3D facial shape contours to estimate the face shape and contour of the user. Based on the facial shape contours, the processing circuitry of network computing devices 18 may determine deformations to apply to a default deformable 3D face model (referred to as a frontal contour). By deforming the frontal contour based on the determined deformations, the frontal contour can be formed to appear like the head of the user.

For example, the frontal contour may be a 3D mesh of primitives that looks like a human head. Network computing devices 18 may store information of the 3D mesh of primitives, such as vertices of the primitives and interconnection information. The deformations that the processing circuitry of network computing devices 18 determine may be how to shift and adjust the primitives within the 3D mesh of the frontal contour so that deformed frontal contour appears like the head of the user.

The processing circuitry of network computing devices 18 may deform the frontal contour based on the determined deformation; however, in some examples, for reasons described in more detail below, the processing circuitry may avoid deforming a neck seam of the frontal contour. For example, the processing circuitry may not deform the base of the neck (e.g., neck seam). The processing circuitry may apply deformations to a neck portion of the frontal contour. The processing circuitry may apply slight deformation closer to the neck seam and gradually increase the deformations applied for higher portions of the neck.

In addition to the deformations, the processing circuitry may be configured to select a body type of the user based on the user provided body type information. Examples of the body type information include height, waist, bust, hip, and/or weight measurements, and/or visual body type selection such as apple, pear, rectangle, etc. These measurements may be adequate from a fit perspective for standard machine-manufactured apparel as the apparel is designed on similar body types. There may be more or fewer examples of body type information that the user provides, and the examples are not limited to the above examples.

In some examples, the processing circuitry may deduce the body type information from full body pictures provided by the user. This may help the user avoid having to enter measurements. However, as users are likely to wear different sizes of apparels in different pictures (e.g., some loose; some tight fitting), the user may need to provide multiple pictures for the processing circuitry to determine an accurate estimation of user body measurements.

The processing circuitry may use the body type information to select a body type that is the best fit for the user. For example, network computing devices 18 may store information for a plurality of body types (e.g., different shapes and sizes of bodies). The body types that network computing devices store may be virtualized body types. Based on the body type information, the processing circuitry may determine which of the plurality of body types is the closest match.

For example, the processing circuitry may determine the nearest virtual body type match of the body measurements from a database of pre-modelled 3D body avatars without face or neck (e.g., a database of a plurality of virtualized body types). The processing circuitry may match the measurements and anthropometric ratios provided by the user vis-à-vis the measurements and anthropometric ratios of the virtualized body types.

By separating out the forming of the face portion of the user from the body creation, the processing circuitry may be configured to generate the graphical representation more quickly than some other techniques to achieve the real-time rendering of the graphical representation. For example, it may be possible for the user to take an image of the entire body and face and upload that image. Network computing devices 18 may then determine deformations for the entire body and face based on the image and deform a mesh of primitives that represents the entire human body. However, performing such operations on the entire body of the user may be complex and time consuming. In one or more example techniques, network computing devices 18 may apply deformations on the head portion and select a body type from pre-generated and stored virtualized body types, rather than determine and apply deformations to the body to create the virtual representation of the user.

Accordingly, there may be technical advantages with the example techniques to achieve run-time virtual representation creation. However, some additional technical solutions may be needed to achieve the technical advantages. For example, because the head portion of the user is separated formed than the body portion, when rendering the head portion and the body portion together to form the virtual representation, there may be distortions.

In one or more examples, the plurality of pre-generated and stored virtualized body types may be pre-generated such that the top of the body types substantially aligns (e.g., such that there is minimal distortion) with the neck seam of the frontal contour before any deformations. To ensure that the alignment between the neck seam of the frontal contour and the top of the plurality of body types persists after deformation of the head portion of the frontal contour, the processing circuitry of one or more network computing devices 18 may not (e.g., may avoid) deforming the neck seam of the frontal contour. Again, the neck seam is at the base of the neck and stops near the beginning of the clavicle. However, the neck seam may include more or less anatomical portions of the body.

By avoiding the deformation of the neck seam, the processing circuitry may ensure that prior to and post deformation of the head portion of the frontal contour, the deformed frontal contour will still substantially align with the selected body type. As the processing circuitry moves up the neck seam along the neck portion of the frontal contour, the processing circuitry may apply deformation to the neck portion of the frontal contour.

With the deformed frontal contour and the selected body type, the processing circuitry of network computing devices 18 may render the deformed frontal contour with the selected body type by aligning the body type with the neck seam of the deformed frontal contour to create the virtual representation of the user. For example, the processing circuitry may determine the vertices of the primitives that form the neck seam on the deformed frontal contour and blend those vertices of the primitives that form the top of the body type to form a unitary structure that is the virtual representation of the user.

The processing circuitry may then output graphical information based on the virtual representation of the user to personal computing device 12. Personal computing device 12 may then display the virtual representation of the user. In some examples, the user, via personal computing device 12, may have selected a virtual apparel that he or she wants to try, and the processing circuitry may render the virtual apparel on top of the virtual representation of the user so that the user can see the style and fit of the apparel. In some examples, personal computing device 12 may be configured to separately receive the virtual representation and the virtual apparel, and personal computing device 12 may render the virtual apparel on the virtual representation.

It should be understood that the above description is one example technique of how network computing devices 18 may generate a virtual representation for rendering on personal computing device 12. However, the example techniques described in this disclosure are not limited to the above example of generating a virtual representation, and other techniques may be used to generate the virtual representation.

In addition to apparel, the user may be also be able to select different accessories (e.g., hairstyles, earrings, sunglasses, etc.) and cosmetics (e.g., lipsticks, eye liners, etc.). For example, once a user creates his or her own virtual representation, the user can request to visualize a 3D accessory or cosmetics on the virtual representation. Given the user requests this in a real-time basis, the processing circuitry of network computing devices 18 may need to deliver a virtual 3D model for the accessories and cosmetic products in a real-time basis.

The example techniques described in this disclosure describe ways in which to generate hairstyles that can be quickly rendered on personal computing device 12. For example, one or more of network computing devices 18 (e.g., network computing device 18A) may be a desktop computing device or a computing device that provides high levels of computing resources with which a content developer can interact. In examples described in this disclosure, one or more of network computing devices 18 may host a hairstyle generation application that algorithmically pre-composites hairstyles in such a manner so as to allow personal computing device 12 to render the hairstyles in real-time.

For instance, the hairstyles may be defined as a plurality of layers that are stacked on top of each other. To show the edges on the hair strands, a transparency map stored on one or more network computing devices 18 may store information indicating which pixels in the layers are fully transparent. The fully transparent pixels cause a break in the continuity of the layer, and hence appear to be an edge of the hair strand. It should be understood that transparent pixel does not necessarily mean that the pixel is fully transparent but could be fully transparent. A transparent pixel is a pixel that is not fully opaque or having an opacity level that is less than an opacity level threshold. In some examples, pixels that are used to define an edge of a hair strand may be substantially (e.g., more than 80% or 90% transparent or fully transparent).

However, the transparent pixels include pixels that are for visible hair strands like at the front edge of the scalp or side edges of the scalp as well as non-visible hair strand edges, such as on the top or back of the head. For instance, in real-life, it is generally easier to see the hair strands edges on the front or side of a person than on the top or back.

To display the hair strands, the GPU on personal computing device 12 goes through and blends the color values of pixels based on their respective opacity in the layers. For instance, the GPU may blend each of the pixels from the scalp to the top of the hair in the respective layers (or start from the tope of hair and work to the scalp). If a pixel is opaque, the blending process may be less complicated because the color value will be the color value of the opaque pixel and some of the blending process can be skipped when there is an opaque pixel.

However, for non-opaque pixels, the GPU may need to perform the blending of color values based on their opacity. Expending GPU resources of blending colors (e.g., red-green-blue (RGB) values) of transparent pixels that are not visible can be time intensive without any benefit. Accordingly, this disclosure describes example ways in which to pre-composite hairstyles with increased opacity for non-visible pixels so that the number of blending operations that the GPU on personal computing device 12 needs to perform is reduced, allowing for faster, real-time rendering. Furthermore, with more opaque pixels, light ray tracing implemented by the GPU on personal computing device 12 may be less complex because the ray bounces off an opaque pixel earlier than needing to pass through multiple layers.

One or more network computing devices 18 may be configured to, via execution of the hairstyle generation application, separate out the visible and non-visible transparent pixels used to create an edge of a hair strand. In general, in compositing of scalps, the scalp layer is usually extended further with full transparency applied. The scalp area usually has varying hair strands and therefore not a perfectly straight line. To recreate this effect, the scalp is usually designed as a 3D plate and transparency is applied to create the visual effect of varying hair line. However, the transparency for the non-visible pixels for edges of hair strands are usually thin strips of transparency to emulate the gaps between hair strands.

Accordingly, there may be significant degree of freedom to detect the pixels that form visible edges of hair strands for which there should be no change. For example, the visible edges of hair strands may eventually go to full transparency. If one or more network computing devices 18 detect fully transparency pixels and work backwards to pixels that have opaque pixels near them, one or more network computing device 18 may detect, programmatically, pixels that form visible edges of hair strands.

For the remaining pixels, it may be possible to increase their opacity. The result may be a version of the virtual hairstyle (e.g., pre-composited version of the virtual hairstyle) and one or more network computing devices 18 may output the virtual hairstyle (e.g., information of virtual hairstyle that the GPU of personal computing device 12 can use to render the hairstyle). As described in more detail, in some examples, one or more computing devices 18 may generate a plurality of versions of a virtual hairstyle using the example techniques described in this disclosure and may output a selected one of the plurality of versions of the virtual hairstyle.

Once the virtual representation is created, personal computing device 12 may be configured to render the virtual representation (e.g., the avatar) for display on personal computing device 12. Personal computing device 12 may be configured to execute mobile renderer 44. Mobile renderer 44 may be configured to render the virtual hairstyle. For example, in a first pass, mobile renderer 44 may cause the GPU of personal computing device to blend pixels in layers (e.g., pixels in same locations in respective layers) that have an opacity level greater than or equal to a threshold opacity level. For example, the GPU may determine that pixels having an opacity level greater than or equal to a threshold opacity level are opaque. Then, in a second pass, the GPU may blend pixels in the layer that have an opacity level less than the threshold opacity level.

As described above, blending of opaque pixels does not require much computation. In the pre-compositing (e.g., generating) the virtual hairstyles, one or more network computing devices 18 may be configured to increase the opacity of pixels such as pixels of non-visible edges of hair strands. In this manner, the computations of the GPU of the personal computing device 12 may be reduced, resulting in faster blending, and therefore overall faster rendering of the virtual hairstyle for display.

Figure 2:
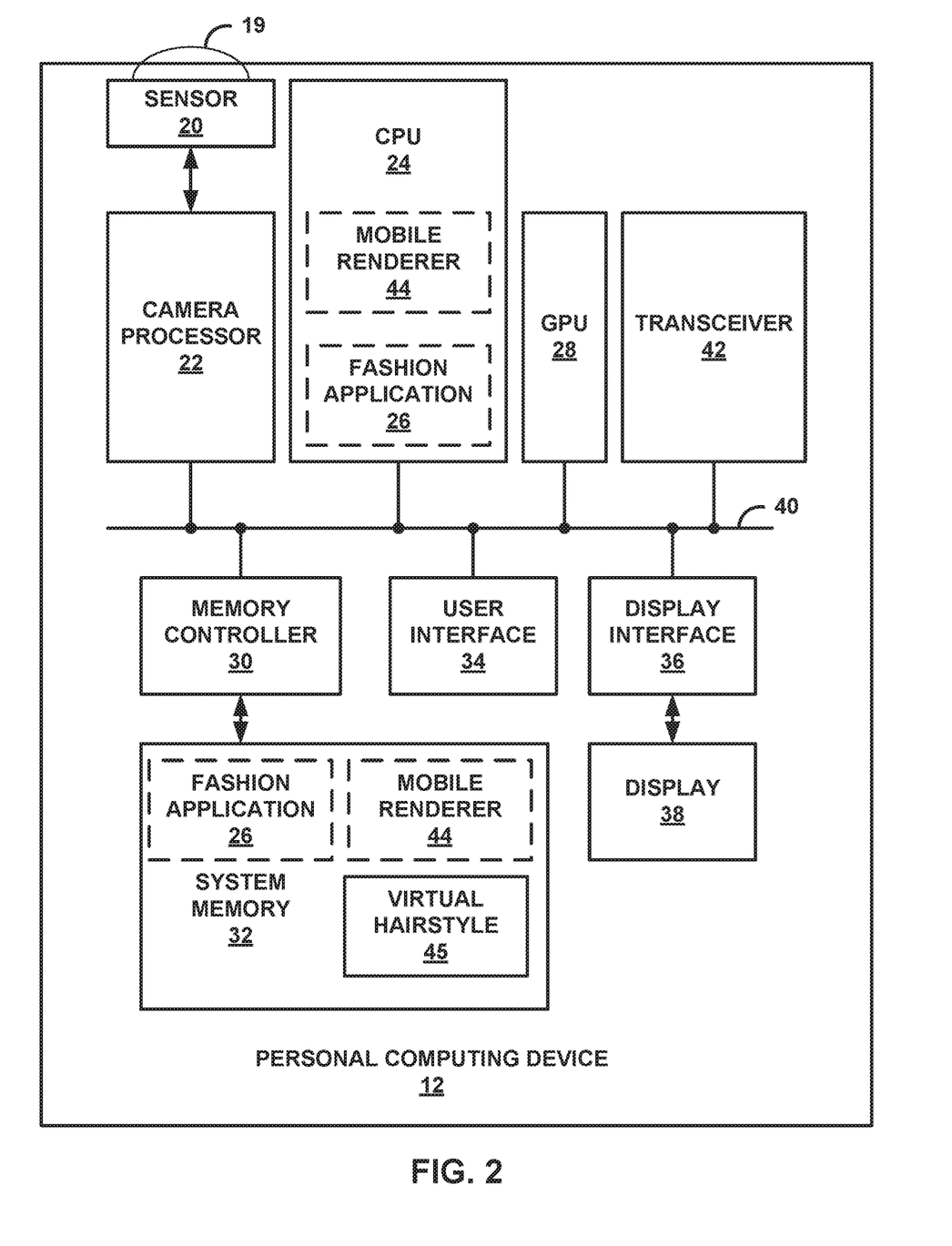
FIG. 2 is a block diagram illustrating an example of a personal computing device configured to display virtual representations of users in accordance with one or more example techniques described in this disclosure.

FIG. 2 is a block diagram illustrating an example of a personal computing device configured to display virtual representations of users in accordance with one or more example techniques described in this disclosure. Examples of personal computing device 12 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA). Additional examples of person computing device 12 include a personal music player, a video player, a display device, a camera, a television, or any other type of device that processes and/or displays graphical data.

As illustrated in the example of FIG. 2, personal computing device 12 includes lens 19 coupled to sensor 20, camera processor 22, a central processing unit (CPU) 24, a graphical processing unit (GPU) 28, memory controller 30 that provides access to system memory 32, user interface 34, and display interface 36 that outputs signals that cause graphical data to be displayed on display 38. Personal computing device 12 also includes transceiver 42, which may include wired or wireless communication links, to communicate with network 14 of FIG. 1. Although FIG. 2 illustrates lens 19 as part of the same device that includes GPU 28, the techniques described in this disclosure are not so limited. Moreover, the shape and configuration of lens 19 is illustrated as one example, and should not be considered limiting.

Also, although the various components are illustrated as separate components, in some examples the components may be combined to form a system on chip (SoC). As an example, camera processor 22, CPU 24, GPU 28, and display interface 36 may be formed on a common integrated circuit (IC) chip. In some examples, one or more of camera processor 22, CPU 24, GPU 28, and display interface 36 may be in separate IC chips. Various other permutations and combinations are possible, and the techniques should not be considered limited to the example illustrated in FIG. 2. The various components illustrated in FIG. 2 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry.

The various units illustrated in FIG. 2 communicate with each other using bus 40. Bus 40 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 2 is merely exemplary, and other configurations of computing devices and/or other image processing systems with the same or different components may be used to implement the techniques of this disclosure.

Camera processor 22 is configured to receive the electrical currents as sensor signals from respective pixels of sensor 20 and process the electrical currents to generate pixel data of images. In some examples, camera processor 14 may be configured as a single-input-multiple-data (SIMD) architecture. Camera processor 14 may perform the same operations on current received from each of the pixels on sensor 20. Each lane of the SIMD architecture may include an image pipeline. The image pipeline includes hardwire circuitry and/or programmable circuitry (e.g., at least one of fixed-function or programmable circuitry) to process the output of the pixels.

Camera processor 22 outputs the resulting images (e.g., pixel values for each of the image pixels) to system memory 32 via memory controller 30. As described in more detail, in response to a user executing fashion application 26, personal computing device 12 may upload the image to one or more network devices 18 for creating virtual representations of the user.

CPU 24 may be a general-purpose or a special-purpose processor that controls operation of personal computing device 12. A user may provide input to personal computing device 12 to cause CPU 24 to execute one or more software applications. The software applications that execute on CPU 24 may include, for example, fashion application 26 and mobile renderer 44, as will be described in more detail below. In the example of FIG. 2, CPU 24 is configured to execute mobile renderer 44. However, in other applications, GPU 28 or other processing circuitry may be configured to execute mobile renderer 44. A user may provide input to personal computing device 12 via one or more input devices (not shown) such as a keyboard, a mouse, a microphone, touchscreen, a touch pad or another input device that is coupled to personal computing device 12 via user interface 34. In some examples, such as where personal computing device 12 is a mobile device (e.g., smartphone or tablet), user interface 34 may be part of display 38.

Display 38 may include a monitor, a television, a projection device, a liquid crystal display (LCD), a plasma display panel, a light emitting diode (LED) array, electronic paper, a surface-conduction electron-emitted display (SED), a laser television display, a nanocrystal display or another type of display unit. Display 38 may be integrated within personal computing device 12. For instance, display 38 may be a screen of a mobile telephone handset or a tablet computer. Alternatively, display 38 may be a stand-alone device coupled to personal computing device 12 via a wired or wireless communications link. For instance, display 38 may be a computer monitor or flat panel display connected to a personal computer via a cable or wireless link.

Camera processor 22, CPU 24, and GPU 28 may store image data, and the like in respective buffers that are allocated within system memory 32. Display interface 36 may retrieve the data from system memory 32 and configure display 38 to display the image represented by the generated image data. In some examples, display interface 36 may include a digital-to-analog converter (DAC) that is configured to convert the digital values retrieved from system memory 32 into an analog signal consumable by display 38. In other examples, display interface 36 may pass the digital values directly to display 38 for processing.

For ease of description, one or more examples are described with user interface 34 being part of display 38 (e.g., where display 38 is a touchscreen). However, the example techniques should not be considered limited to such examples.

Memory controller 30 facilitates the transfer of data going into and out of system memory 32. For example, memory controller 30 may receive memory read and write commands, and service such commands with respect to memory 32 in order to provide memory services for the components in personal computing device 12. Memory controller 30 is communicatively coupled to system memory 32. Although memory controller 30 is illustrated in the example of personal computing device 12 of FIG. 2 as being a processing circuit that is separate from both CPU 28 and system memory 32, in other examples, some or all of the functionality of memory controller 30 may be implemented on one or both of CPU 24 and system memory 32.

System memory 32 may store program modules and/or instructions and/or data that are accessible by camera processor 22, CPU 24, and GPU 28. For example, system memory 32 may store user applications (e.g., fashion application 26 and mobile renderer 44), resulting images from camera processor 22, rendered image content from GPU 28, etc. System memory 32 may additionally store information for use by and/or generated by other components of personal computing device 12. System memory 32 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 32 may include instructions that cause camera processor 22, CPU 24, GPU 28, and display interface 36 to perform the functions ascribed to these components in this disclosure. Accordingly, system memory 32 may be a computer-readable storage medium having instructions stored thereon that, when executed, cause one or more processors (e.g., camera processor 22, CPU 24, GPU 28, and display interface 36) to perform various functions.

In some examples, system memory 32 is a non-transitory storage medium. The term "non-transitory" indicates that the storage medium is not embodied in a carrier wave or a propagated signal. However, the term "non-transitory" should not be interpreted to mean that system memory 32 is non-movable or that its contents are static. As one example, system memory 32 may be removed from personal computing device 12, and moved to another device. As another example, memory, substantially similar to system memory 32, may be inserted into personal computing device 12. In certain examples, a non-transitory storage medium may store data that can, over time, change (e.g., in RAM).

As illustrated, one example of the software application that CPU 24 executes is fashion application 26. The user may see a thumbnail indication of fashion application 26 on display 38, and when the user wants to interact with fashion application 26 (e.g., such as when the user wants to determine fit and style of apparel or accessories), the user touches the thumbnail to execute fashion application 26 on CPU 24. CPU 24 may also execute mobile renderer 44 in order to render the virtual representation and the virtual hairstyle for display on personal computing device 12.

In response to executing fashion application 26, the user may be prompted, via display 38, to take an image of himself or herself (e.g., a selfie). The user may then take the selfie, ensuring that his or her face is visible. For instance, in response to interacting with the prompts provided on display 38, lens 19 and sensor 20 capture a selfie of the user that camera processor 22 process and display 38 displays within the graphical interface generated by the execution of fashion application 26. Rather than or in addition to taking a selfie, display 38, responsive to the execution of fashion application 26, may instruct the user to retrieve a pre-stored selfie from system memory 32.

In some examples, display 28, responsive to the execution of fashion application 26, may prompt the user to input body type information such as one or more of waist, height, bust, body shape, and the like. The waist, height, bust, and body shape are examples of body type parameters, and there may be additional examples of body type parameters. In some examples, in addition to or instead of inputting body type information, the user may take additional selfies that capture the full body of the user, from which body type information may be determined.

CPU 24, via execution of fashion application 26 and/or mobile renderer 44, may cause transceiver 42 to output the image (e.g., selfie image) and the user inputted body type information and/or the body image to one or more network computing devices 18 for network computing devices 18 to create a virtual representation of the user, in accordance with one or more example techniques described in this disclosure. In addition, fashion application 26 may allow the user to select, via display 38, apparels and accessories that the user may want to virtually try-on to see the style and fit. CPU 24, via execution of fashion application 26, may cause transceiver 42 to also output information of the apparels and accessories.

In one example, one or more network computing devices 18 may create the virtual representation of the user using the example techniques described in this disclosure and output graphical information of the virtual representation to personal computing device 12. In some examples, mobile renderer 44 may be configured to render the virtual representation created by the one or more network computing devices 18. In other examples, mobile renderer 44 may be configured to generate the virtual representation of the user itself or to generate a default, generic virtual representation. In one example of the disclosure, mobile renderer 44 may be configured to generate a series of commands and data (e.g., rendering commands that include shaders, vertices, color information, and other data used to render the virtual representation) for how GPU 28 is to render the virtual representation. In other examples, CPU 24 itself may be configured to render the virtual representation.

In some examples, the rendering commands may conform to a graphics application programming interface (API), such as, e.g., an Open Graphics Library (OpenGL®) API, OpenGL® 3.3, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

GPU 28 receives the rendering commands and data, and, in response, GPU 28 performs the operations defined by the commands on the received data to render the virtual representation of the user, possibly with the virtual apparel and accessories visible to the user. GPU 28 stores the graphical data as the result of the rendering in system memory 32, and display interface 36 retrieves the graphical data for display on display 38.

Display 38, via execution of fashion application 26 and/or mobile renderer 44, displays options for the user to request new apparel or accessories or hairstyles. In response, CPU 24, via execution of fashion application 26 and/or mobile renderer 44, causes transceiver 42 to output information of the requested apparel or accessories or hairstyle. Transceiver 42 receives graphical information for the newly requested apparel or accessories or hairstyle, and GPU 28 renders the virtual representation with the newly requested apparel or accessories or hairstyle.

In this way, the example techniques described can be used to create an immersive experience for the user to determine the style and fit of an apparel or accessory or hairstyle without needing to physically try it on or physically change his or her hairstyle. As described, the user may desire to view the apparel and accessory or hairstyle on the virtual representation in run-time (e.g., real-time) so that the user can quickly determine whether to try on different apparel or accessories or change hairstyles. Accordingly, network computing devices 18 may be configured to generate the graphical information in run-time so that personal computing device 12 can display the virtual representation and apparel and accessories or hairstyle in run-time. In other examples, personal computing device 12, executing mobile renderer 54, may be configured to render and display virtual representations (e.g., avatars) itself.

In one example, via the execution of fashion application 26, the user may be able to perform various tasks to determine the style and fit. Accordingly, this disclosure describes techniques to provide consumers an immersive end to end personalized 3D experience for fashion discovery and commerce on mobile. The immersive personalized 3D experience may start with the consumer or user creating a realistic 3D avatar of themselves in a few seconds with a simple 2D selfie, two core measurements, height, waist and two additional measurements, either bust, hip or weight and body shape which can be chosen from a visual.

During execution of fashion application 26, the user is provided guidance and cues to get the selfie right and a realistic avatar (e.g., virtual representation). The avatar created by the user can be edited to further customize and personalize. With the 3D avatar created, the user can then use a marketplace (e.g., as provided by execution of fashion application 26) to find hairstyles, find apparels, accessories, or beauty and personal care products from different vendors, and add them to the virtual fitting room for look and fit evaluation. Users, via fashion application 26, can also search for related items based on an existing image of an apparel or a picture taken of the apparel. The closest match found can be added to the fitting room for look and fit evaluation.

User can then evaluate and compare the apparel in a virtual fitting room, displayed via execution of fashion application 26, for look and fit by just toggling apparel in the fitting room swatch and experience a full makeover with accessories, beauty and personal care products, and different hairstyles. Users can also place themselves in different environment settings like a town square to get a realistic sense of look and fit. Users can share their avatars with the full makeover with their friends and family for comments and feedback and complete their purchase with the shopping cart.

In some examples, when the user decides to change hairstyles, the user may submit a request for a different hairstyle. In response, one or more network computing devices 18 may output the requested hairstyle, and personal computing device 12 may store the requested hairstyle as virtual hairstyle 45 in system memory 32. Virtual hairstyle 45 may include opacity level values and color values (e.g., RGB values) for the pixels in the layers that form virtual hairstyle 45. As described above, and described in more detail below, virtual hairstyle 45 may have been pre-composited in a specific manner to allow GPU 28 to render virtual hairstyle 45 in real-time.

GPU 28 may be configured to implement a graphics pipeline that includes programmable circuitry and fixed-function circuitry. GPU 28 is an example of processing circuitry configured to perform one or more example techniques described in this disclosure. In general, GPU 28 (e.g., which is an example processing circuitry) may be configured to perform one or more example techniques described in this disclosure via fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

GPU 28 may include arithmetic logic units (ALUs), elementary function units (EFUs), digital circuits, analog circuits, and/or programmable cores, formed from programmable circuits. In examples where the operations of GPU 28 are performed using software executed by the programmable circuits, memory 32 may store the object code of the software that GPU 28 receives and executes.

Mobile renderer 44 may cause GPU 28 to render virtual hairstyle 45 for display on display 38. Part of the rendering includes blending of pixels in the different layers. As one example, mobile renderer 44 may cause the graphics pipeline of GPU 28 to blend, in a first pass, one or more pixels of virtual hairstyle 45 having an opacity level greater than or equal to a threshold opacity level. For instance, GPU 28 may treat all pixels having an opacity level greater than 90% as a fully opaque. In this example, 90% is the threshold opacity level but other threshold opacity levels are possible. To perform the blending, GPU 28 may change the pixel buffer RGB color value equal to the RGB color value of the opaque pixel (e.g., the color value for the pixel that is opaque and furthest from the scalp). For a second pass, mobile renderer 44 may cause the graphics pipeline of GPU 28 to blend one or more pixels of virtual hairstyle 45 having an opacity level less than the threshold opacity level. For example, GPU 28 may blend one or more pixels of virtual hairstyle 45 having an opacity level less than the threshold opacity level with the one or more pixels of the received version of the generated virtual hairstyle having the opacity level less than the threshold opacity level. For instance, GPU 28 may blend one or more pixels of virtual hairstyle 45 having an opacity level less than the threshold opacity level on top of the pixels from the result of the first pass.

As one example, the color blending equation is rgb_trans_pixel*opacity+rgb_opaque_pass_1*(1−opacity). In this equation, rgb_trans_pixel is the RGB color value of the transparent pixel. This transparent pixel need not necessarily be a pixel for an edge of a hair strand and may be a hair strand itself. Opacity is the opacity level of the pixel, and rgb_opaque_pass_1 is the result from the first pass.

In the above example, the pixels that are being blended may be overlapping pixels in different layers. In this case, the layers could be background scene or the user head that gets blended with the hair style. Layers may be considered as different objects that a light ray will encounter if the light ray were to pass through any particular angle. The hair will be hit multiple times for each mesh plate layer it has; head would have front and back hits etc. Also, it should be understood that processing with the graphics pipeline does not require that the entire graphics pipeline be used.

Figure 3:
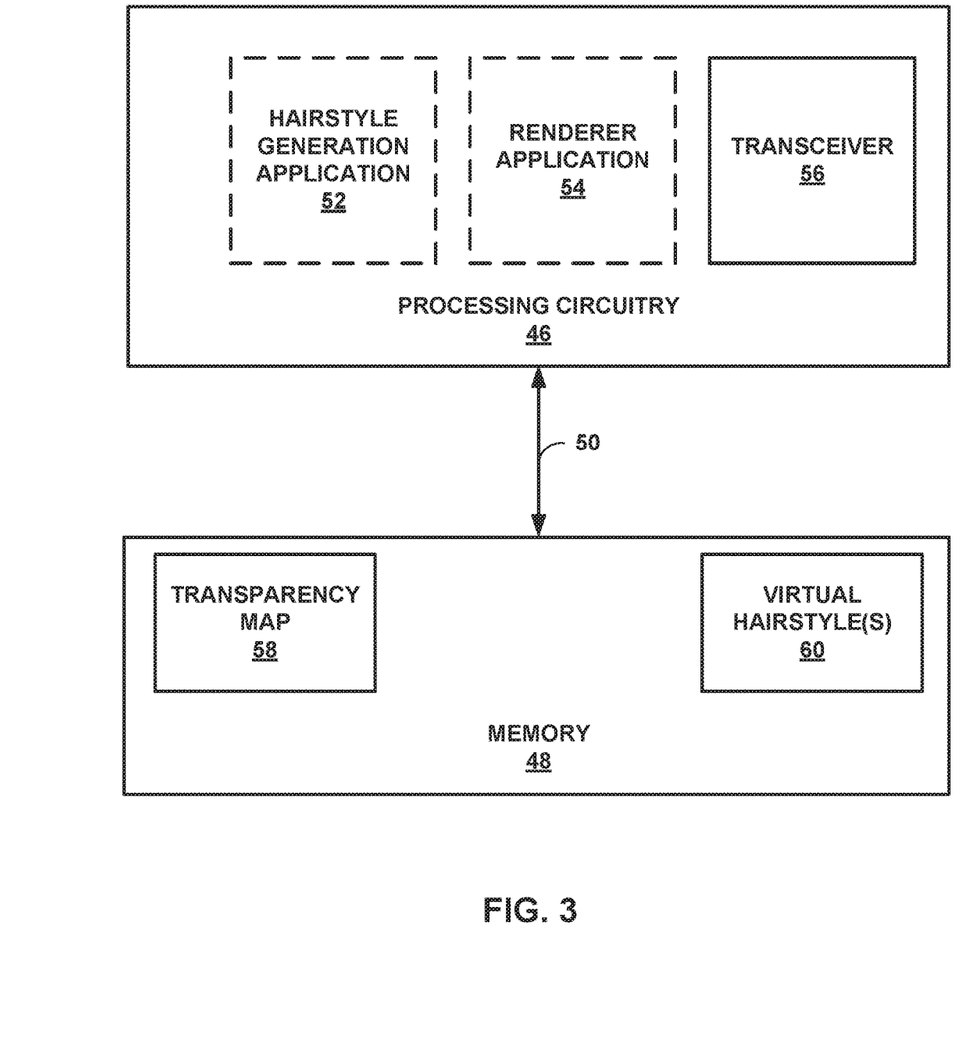
FIG. 3 is a block diagram illustrating an example of processing circuitry configured to generate virtual hairstyles in accordance with one or more example techniques described in this disclosure.

FIG. 3 is a block diagram illustrating an example of processing circuitry configured to generate virtual hairstyles in accordance with one or more example techniques described in this disclosure. FIG. 3 illustrates processing circuit 46 and memory 48. Processing circuity 44 and memory 48 may be distributed across one or more network computing devices 18 within cloud 16. In some examples, processing circuitry 46 and memory 48 may be the processing circuitry and memory of one of network computing devices 18. As described above, cloud 16 provides a computing infrastructure where operations are distributed across network computing devices 18. Accordingly, FIG. 3 may be considered as illustrating one or more network computing devices 18 that include processing circuitry 46 and memory 48.

For example, processing circuitry 46 is illustrated as executing hairstyle generation application 52 and renderer application 54. Transceiver 56 is circuitry with which processing circuitry 46 receives and transmits information. Also, memory 48 is illustrated as storing transparency map 58 and one or more virtual hairstyles 60. However, it may be possible, based on control of cloud 16 or workload of network computing devices 18 that one or more of the applications shown as executing on processing circuitry 46 execute on different network computing devices 18. Also, it may be possible that different network computing devices 18 each store some of the information shown to be stored in memory 48.

The example of FIG. 3 captures these various examples where processing circuitry 46 and memory 48 are distributed among one or more network computing devices 18. As illustrated, processing circuitry 46 and memory 48 communicate via communication channel 50. Communication channel 50 may be a bus, similar to bus 40 of FIG. 1. In some examples, communication channel 50 may be a packet-based network, such as a local area network, a wide-area network, or a global network such as the Internet.

Processing circuitry 46 may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Also, memory 48 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

Although the example of FIG. 3 shows applications executing on processing circuitry 46, the example techniques are not limited to any particular type of processing circuitry. In general, processing circuitry 46 may be configured to perform one or more example techniques described in this disclosure via fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Processing circuitry 46 may include arithmetic logic units (ALUs), elementary function units (EFUs), digital circuits, analog circuits, and/or programmable cores, formed from programmable circuits. In examples where the operations of processing circuitry 46 are performed using software executed by the programmable circuits, memory 48 may store the object code of the software that processing circuitry 46 receives and executes.

Hairstyle generation application 52 and renderer application 54 are illustrated as separate simply to ease with understanding. Hairstyle generation application 52 and renderer application 54 may be structured as software functions that are called by high-level application executing on processing circuitry 46. In some examples, hairstyle generation application 52 and renderer application 54 may be integrated into a common application that processing circuitry 46 executes.

In some examples, processing circuitry 46 may be configured to generate a virtual representation using the example techniques described above. However, processing circuitry 46 may use other techniques as well to generate the virtual representation of the user.

As described above, there may be freedom to detect the visible edges for which there may not be any change in opacity level. To detect the visible edges, hairstyle generation application 52 may configure processing circuitry 46 to identify substantially transparent pixels in transparency map 58 (e.g., that is pre-generated based on edge detection of hair strands) for a virtual hairstyle. As described, the virtual hairstyle includes a plurality of layers, and the substantially transparent pixels identify edges on hair strands within the virtual hairstyle. Substantially transparent pixels may be pixels that 100% transparent, greater than 90% transparent, or greater than 80% transparent, as a few non-limiting examples of substantially transparent pixels.

Hairstyle generation application 52 may identify a first set of pixels in one or more of the plurality of layers that are a first number of pixels away from the identified substantially transparent pixels. These identified pixels may not have their opacity levels changed. Therefore, hairstyle generation application 52 may be considered as discarding pixels that are "n" pixels away from a substantially (e.g., including fully) transparent pixel so that the discarded pixels do not have their opacity level changed and only keeping the remaining pixels for which the opacity level may be changed (e.g., pixels of the non-visible edges). This effectively helps remove all edge pixels that are visible (e.g., removes visible edges of hair strands) from further processing where opacity levels are changed before increasing opacity for the remainder pixels.

For instance, UV mapping is usually done to ensure each 3D texel (a 3D vertex point) is mapped to a unique 2D pixel in the transparency image map and a unique RGB pixel in the texture image map. The models are therefore created with colocalized transparency effects (e.g., the hair strands area in the 3D space will be mapped to a region in the 2D transparency image map). The hair strands may be unwrapped in 2D but kept together for easy transparency editing. In case of hair strands and other visible edges, this detailing is retained so that the rendering looks photorealistic. In this case of hair strands, the 2D transparency image map will have regions that are blended and edited together in unwrapped 2D image space but are co-located together mapping directly to the edges of the 3D scalp mesh plate.

Hairstyle generation application 52 may utilize the assumption that the 2D transparency image map will have regions that are blended and edited together in unwrapped 2D image space but are co-located together mapping directly to the edges of the 3D scalp mesh plate and work backwards. For instance, if hairstyle generation application 52 starts from a fully transparent pixel that has opaque pixels in any direction to a nth order, hairstyle generation application 52 can safely determine that these pixels should be discarded to retain the detail and accordingly the photo-realistic effects while rendering. Post discarding, hairstyle generation application 52 may identify the non-visible edges (e.g., the volume of hair strands inside the outside visible layer) and simply edit those pixels to reduce the bulk of processing time during rendering For example, hairstyle generation application 52 may increase an opacity level for a second set of pixels by a first amount. The second set of pixels excludes pixels from the first set of pixels which were discarded. As one example, hairstyle generation application 52 may normalize the opacity levels for the second set of pixels from 0 to 100 to "m" to 100 to retain their relative transparency levels but increase opacity levels to m+%.

Renderer application 54 may render the resulting virtual hairstyle and store the resulting virtual hairstyle as one of one or more versions of virtual hairstyles 60. In some examples, processing circuitry 46 may be configured to execute hairstyle generation application 52 with different levels of "n" (pixel distance order for discard and "m" (% of minimum opacity bump) to generate the one or more versions of virtual hairstyles 60. In some examples, a content creator may evaluate one or more virtual hairstyles 60 to determine which version of virtual hairstyles 60 looks the most real and select that version of the virtual hairstyle. This process may take seconds. Then, whenever a user selects the particular hairstyle, transceiver 56 may output the preselected version of virtual hairstyles 60.

The generation of a plurality of versions of virtual hairstyles 60 is not necessary in every example. In some examples, processing circuitry 46 may generate only one version of the virtual hairstyle. Also, there may be other ways in which to select a version of virtual hairstyles 60 that does not include human intervention such as by artificial intelligence (AI) training or other image recognition techniques.

Figure 4:
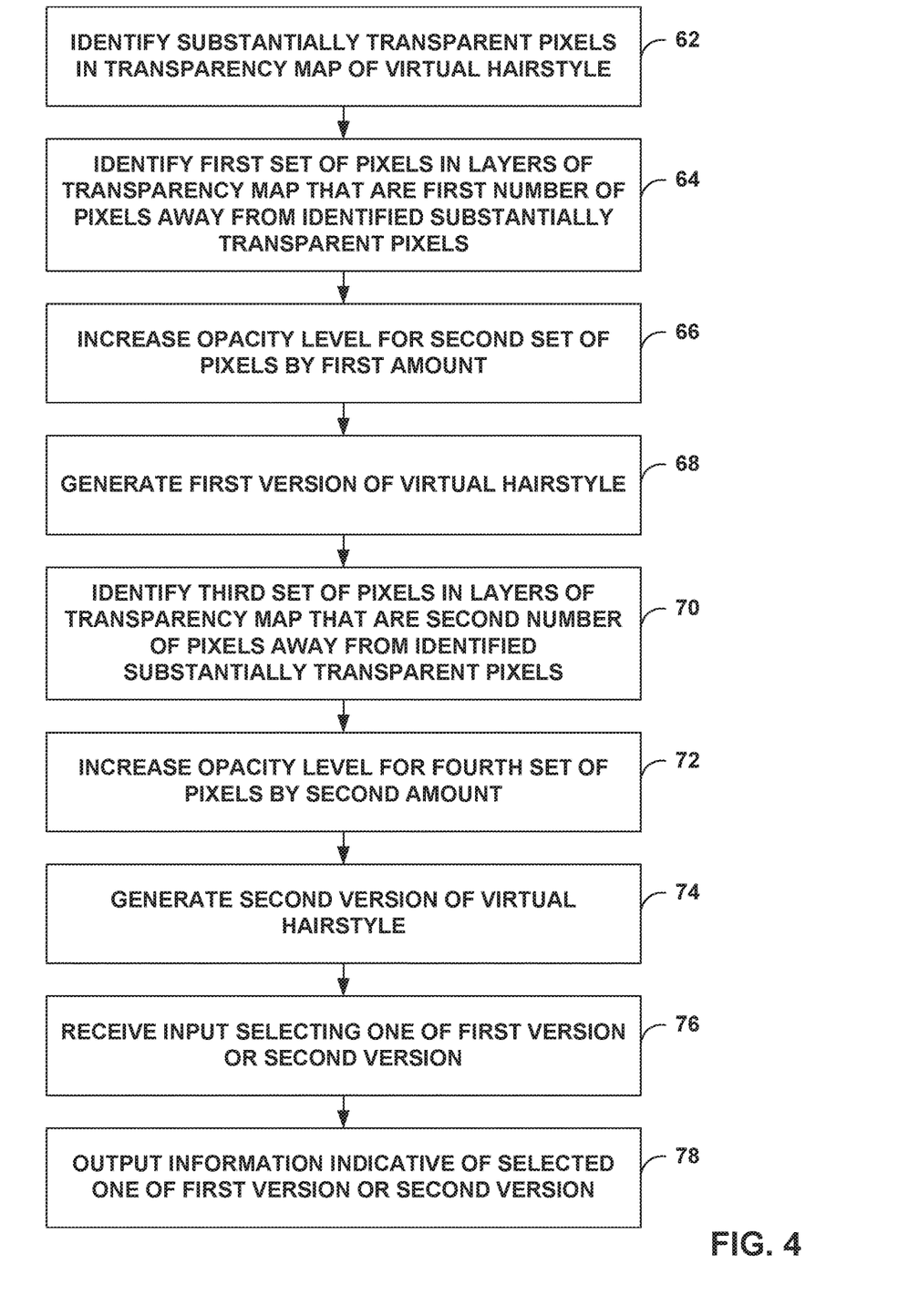
FIG. 4 is a flowchart illustrating examples of pre-compositing hairstyles.

FIG. 4 is a flowchart illustrating examples of pre-compositing hairstyles. Hairstyle generation application 52 may be configured to identify substantially transparent pixels in a transparency map 58 for a virtual hairstyle (62). As described above, the virtual hairstyle includes a plurality of layers, and the substantially transparent pixels identify edges on hair strands within the virtual hairstyle. The substantially transparent pixels include pixels that define visible edges of hair strands and include pixels that define non-visible edges of hair strands.

Hairstyle generation application 52 may identify a first set of pixels in one or more of the plurality of layers that are a first number of pixels away from the identified substantially transparent pixels (64). In some examples, the first set of pixels may not have their opacity levels changed. For instance, hairstyle generation application 52 may increase an opacity level for a second set of pixels by a first amount (66). The second set of pixels excludes pixels from the first set of pixels. In this way, hairstyle generation application 52 may be considered as discarding pixels that are "n" pixels away from a substantially (e.g., including fully) transparent pixel so that the discarded pixels do not have their opacity level changed and only keeping the remaining pixels for which the opacity level may be changed (e.g., pixels of the non-visible edges).

Renderer application 54 may generate a first version of the virtual hairstyle based on the first set of pixels and the second set of pixels having the increased opacity level (68). For example, renderer application 54 may render the resulting virtual hairstyle and store the resulting virtual hairstyle as one of one or more versions of virtual hairstyles 60.

Hairstyle generation application 52 may identify a third set of pixels in layers of transparency map 58 that are a second number of pixels away from identified substantially transparent pixels (70). For instance, hairstyle generation application 52 may have previously identified the first set of pixels in layers of transparency map 58 that are "n1" number of pixels away from identified substantially transparent pixels, and then hairstyle generation application 52 may identify the third set of pixels in layers of transparency map 58 that are "n2" number of pixels away from identified substantially transparent pixels.

Hairstyle generation application 52 may increase an opacity level for a fourth set of pixels by a second amount (72). The fourth set of pixels excludes pixels from the third set of pixels. For instance, hairstyle generation application 52 may have previously increased the opacity level of the second set of pixels by "m1," and then hairstyle generation application 52 may increase the opacity level of the fourth set of pixels by "m2."

Renderer application 54 may generate a second version of the virtual hairstyle based on the third set of pixels and the fourth set of pixels having the increased opacity level (68). For example, renderer application 54 may render the resulting virtual hairstyle and store the resulting virtual hairstyle as one of one or more versions of virtual hairstyles 60. In this manner, processing circuitry 46 may be configured to execute hairstyle generation application 52 with different levels of "n" (pixel distance order for discard and "m" (% of minimum opacity bump) to generate the one or more versions of virtual hairstyles 60.

Processing circuitry 46 may receive input selection one of the first version or the second version of the hairstyle (76). Processing circuitry 46 may cause transceiver 56 to output information of the selected one of the first version or the second version of the hairstyle (78).

Figure 5:
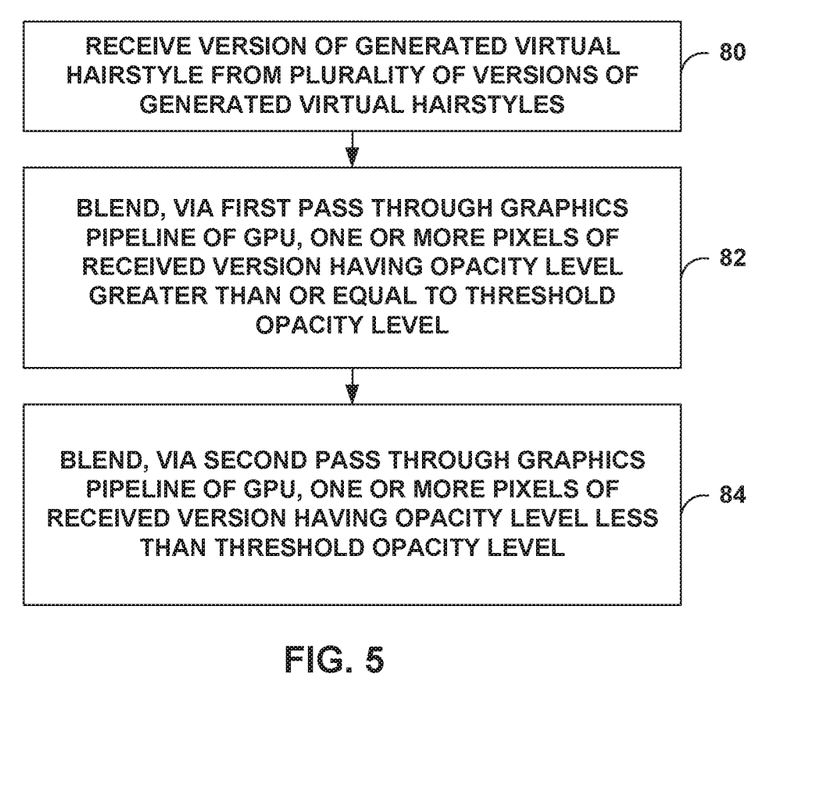
FIG. 5 is a flowchart illustrating examples of blending layers for rendering hairstyles.

FIG. 5 is a flowchart illustrating examples of blending layers for rendering hairstyles. Personal computing device 12 may receive a selected version of generated virtual hairstyle from plurality of versions of generated virtual hairstyles (80). For example, in response to the user executing fashion application 26 and user input for a selection of a virtual hairstyle, personal computing device 12, via transceiver 42, may output a request for the selected virtual hairstyle to one or more network computing devices 18 for the selected one of virtual hairstyles 60. Personal computing device 12 may receive the selected virtual hairstyle and store the selected virtual hairstyle as virtual hairstyle 45 in system memory 42.

Mobile renderer 44 may cause GPU 28 to render virtual hairstyle 45 via two blending operations (and in some examples, with no more than two blending operations) to render virtual hairstyle 45 for display on display 38. For instance, mobile renderer 44 may cause the graphics pipeline of GPU 28 to blend, in a first pass, one or more pixels of virtual hairstyle 45 having an opacity level greater than or equal to a threshold opacity level (82). For instance, GPU 28 may treat all pixels having an opacity level greater than 90% as a fully opaque. In this example, 90% is the threshold opacity level but other threshold opacity levels are possible. To perform the blending, GPU 28 may change the pixel buffer RGB color value equal to the RGB color value of the opaque pixel (e.g., the color value for the pixel that is opaque and furthest from the scalp).

Mobile renderer 44 may cause the graphics pipeline of GPU 28 to blend, in a second pass, one or more pixels of virtual hairstyle 45 having an opacity level less than the threshold opacity level (84). For a second pass, mobile renderer 44 may cause the graphics pipeline of GPU 28 to blend one or more pixels of virtual hairstyle 45 having an opacity level less than the threshold opacity level. For example, GPU 28 may blend one or more pixels of virtual hairstyle 45 having an opacity level less than the threshold opacity level with the one or more pixels of the received version of the generated virtual hairstyle having the opacity level less than the threshold opacity level. For instance, GPU 28 may blend one or more pixels of virtual hairstyle 45 having an opacity level less than the threshold opacity level on top of the pixels from the result of the first pass. As described above, in one example, the color blending equation is rgb_trans_pixel*opacity+rgb_opaque_pass_1*(1−opacity). In this equation, rgb_trans_pixel is the RGB color value of the transparent pixel. This transparent pixel need not necessarily be a pixel for an edge of a hair strand and may be a hair strand itself. Opacity is the opacity level of the pixel, and rgb_opaque_pass_1 is the result from the first pass.

The techniques of this disclosure may be implemented in a wide variety of computing devices. Any of the described units, modules or components may be implemented together or separately as discrete but interoperable logic devices. Depiction of different features as applications or units is intended to highlight different functional aspects and does not necessarily imply that such applications or units must be realized by separate hardware or software components. Rather, functionality associated with one or more applications or units may be performed by separate hardware or software components, or integrated within common or separate hardware or software components.

The techniques described in this disclosure may be implemented, at least in part, in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry. The terms "processor," "processing circuitry," "controller" or "control module" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as random access memory (RAM), read-only memory (ROM), non-volatile random access memory (NVRAM), electrically erasable programmable read-only memory (EEPROM), FLASH memory, magnetic media, optical media, or the like that is tangible. The computer-readable storage media may be referred to as non-transitory. A server, client computing device, or any other computing device may also contain a more portable removable memory type to enable easy data transfer or offline data analysis. The instructions may be executed to support one or more aspects of the functionality described in this disclosure.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the devices, systems, and methods in accordance with the description provided in this disclosure are provided below.

What is claimed is:

1. A method of virtual representation creation, the method comprising:
   identifying substantially transparent pixels in a transparency map for a virtual hairstyle, wherein the virtual hairstyle includes a plurality of layers, wherein the substantially transparent pixels identify edges on hair strands within the virtual hairstyle;
   identifying a first set of pixels in one or more of the plurality of layers that are a first number of pixels away from the identified substantially transparent pixels;
   increasing an opacity level for a second set of pixels by a first amount, wherein the second set of pixels excludes pixels from the first set of pixels;
   generating the virtual hairstyle based on the first set of pixels and the second set of pixels having the increased opacity level, wherein the generated virtual hairstyle comprises a first version of a plurality of versions of the generated virtual hairstyle;
   receiving a version of the generated virtual hairstyle from the plurality of versions of the generated virtual hairstyle;
   blending, via a first pass through a graphics pipeline of a graphics processing unit (GPU), one or more pixels of the received version of the generated virtual hairstyle having an opacity level greater than or equal to a threshold opacity level; and
   blending, via a second pass through the graphics pipeline of the GPU, one or more pixels of the received version of the generated virtual hairstyle having an opacity level less than the threshold opacity level.

2. The method of claim 1, further comprising:
   identifying a third set of pixels in one or more of the plurality of layers that are a second number of pixels away from the identified substantially transparent pixels;
   increasing an opacity level for a fourth set of pixels by a second amount, wherein the fourth set of pixels excludes pixels from the third set of pixels; and
   generating a second version of the virtual hairstyle based on the third set of pixels and the fourth set of pixels having the increased opacity level.

3. The method of claim 2, further comprising:
   receiving input selecting one of the first version of the virtual hairstyle or the second version of the virtual hairstyle; and
   outputting information of the selected one of the first version of the virtual hairstyle or the second version of the virtual hairstyle.

4. The method of claim 1, wherein the substantially transparent pixels include pixels that define visible edges of hair strands and include pixels that define non-visible edges of hair strands.

5. The method of claim 4, wherein the second set of pixels comprises pixels that define visible edges of hair strands.

6. The method of claim 1, wherein blending the one or more pixels of the received version of the generated virtual hairstyle having the opacity level less than the threshold opacity level comprises blending the one or more pixels of the received version of the generated virtual hairstyle having the opacity level greater than or equal to the threshold opacity level with the one or more pixels of the received version of the generated virtual hairstyle having the opacity level less than the threshold opacity level.

7. A system of virtual representation creation, the system comprising:
a memory configured to store a transparency map for a virtual hairstyle;
a personal computing device comprising graphics processing unit (GPU); and
one or more network computing devices comprising processing circuitry configured to:
identify substantially transparent pixels in the transparency map for the virtual hairstyle, wherein the virtual hairstyle includes a plurality of layers, wherein the substantially transparent pixels identify edges on hair strands within the virtual hairstyle;
identify a first set of pixels in one or more of the plurality of layers that are a first number of pixels away from the identified substantially transparent pixels;
increase an opacity level for a second set of pixels by a first amount, wherein the second set of pixels excludes pixels from the first set of pixels;
generate the virtual hairstyle based on the first set of pixels and the second set of pixels having the increased opacity level, wherein the generated virtual hairstyle comprises a first version of a plurality of versions of the generated virtual hairstyle;
wherein the GPU is configured to:
receive a version of the generated virtual hairstyle from the plurality of versions of the generated virtual hairstyle;
blend, via a first pass through a graphics pipeline of the GPU, one or more pixels of the received version of the generated virtual hairstyle having an opacity level greater than or equal to a threshold opacity level; and
blend, via a second pass through the graphics pipeline of the GPU, one or more pixels of the received version of the generated virtual hairstyle having an opacity level less than the threshold opacity level.

8. The system of claim 7, wherein the processing circuitry is configured to:
identify a third set of pixels in one or more of the plurality of layers that are a second number of pixels away from the identified substantially transparent pixels;
increase an opacity level for a fourth set of pixels by a second amount, wherein the fourth set of pixels excludes pixels from the third set of pixels; and
generate a second version of the virtual hairstyle based on the third set of pixels and the fourth set of pixels having the increased opacity level.

9. The system of claim 8, wherein the processing circuitry is configured to:
receive input selecting one of the first version of the virtual hairstyle or the second version of the virtual hairstyle; and
output information of the selected one of the first version of the virtual hairstyle or the second version of the virtual hairstyle.

10. The system of claim 7, wherein the substantially transparent pixels include pixels that define visible edges of hair strands and include pixels that define non-visible edges of hair strands.

11. The system of claim 10, wherein the second set of pixels comprises pixels that define visible edges of hair strands.

12. The system of claim 7, wherein to blend the one or more pixels of the received version of the generated virtual hairstyle having the opacity level less than the threshold opacity level, the GPU is configured to blend the one or more pixels of the received version of the generated virtual hairstyle having the opacity level greater than or equal to the threshold opacity level with the one or more pixels of the received version of the generated virtual hairstyle having the opacity level less than the threshold opacity level.

13. A personal computing device comprising:
a memory configured to store a version of a generated virtual hairstyle; and
processing circuitry configured to:
blend, in a via a first pass through a graphics pipeline of the processing circuitry, one or more pixels of the version of the generated virtual hairstyle having an opacity level greater than or equal to a threshold opacity level; and
blend, via a second pass through the graphics pipeline of the processing circuitry, one or more pixels of the version of the generated virtual hairstyle having an opacity level less than the threshold opacity level,
wherein the generated virtual hairstyle is generated by:
identifying substantially transparent pixels in a transparency map for the virtual hairstyle, wherein the virtual hairstyle includes a plurality of layers, wherein the substantially transparent pixels identify edges on hair strands within the virtual hairstyle;
identifying a first set of pixels in one or more of the plurality of layers that are a first number of pixels away from the identified substantially transparent pixels; and
increasing an opacity level for a second set of pixels by a first amount, wherein the second set of pixels excludes pixels from the first set of pixels.

14. The personal computing device of claim 13, wherein to blend the one or more pixels of the version of the generated virtual hairstyle having the opacity level less than the threshold opacity level, the processing circuitry is configured to blend the one or more pixels of the version of the generated virtual hairstyle having the opacity level greater than or equal to the threshold opacity level with the one or more pixels of the received version of the generated virtual hairstyle having the opacity level less than the threshold opacity level.

15. The personal computing device of claim 13, wherein the processing circuitry comprises a graphics processing unit (GPU).

16. The personal computing device of claim 13, wherein the processing circuitry is configured to output for display the virtual hairstyle.

\* \* \* \* \*